US011514294B2

(12) United States Patent
Snelgrove et al.

(10) Patent No.: US 11,514,294 B2
(45) Date of Patent: Nov. 29, 2022

(54) SYSTEM AND METHOD FOR ENERGY-EFFICIENT IMPLEMENTATION OF NEURAL NETWORKS

(71) Applicant: UNTETHER AI CORPORATION, Toronto (CA)

(72) Inventors: William Martin Snelgrove, Toronto (CA); Darrick Wiebe, Toronto (CA)

(73) Assignee: UNTETHER AI CORPORATION, Toronto (CA)

( * ) Notice: Subject to any disclaimer, the term of this patent is extended or adjusted under 35 U.S.C. 154(b) by 952 days.

(21) Appl. No.: 15/903,754

(22) Filed: Feb. 23, 2018

(65) Prior Publication Data
US 2018/0253639 A1  Sep. 6, 2018

Related U.S. Application Data

(60) Provisional application No. 62/463,318, filed on Feb. 24, 2017.

(51) Int. Cl.
*G06F 9/38* (2018.01)
*G06N 3/04* (2006.01)
*G06F 13/40* (2006.01)
*G06N 3/063* (2006.01)

(52) U.S. Cl.
CPC ......... *G06N 3/0454* (2013.01); *G06F 9/3887* (2013.01); *G06F 13/4022* (2013.01); *G06N 3/063* (2013.01); *Y02D 10/00* (2018.01)

(58) Field of Classification Search
CPC .. G06N 3/0454; G06N 3/0603; G06F 9/3887; G06F 13/4022; Y02D 10/00
See application file for complete search history.

(56) References Cited

U.S. PATENT DOCUMENTS

| | | | | |
|---|---|---|---|---|
| 4,896,265 A | * | 1/1990 | Fiduccia | G06F 15/8023 712/28 |
| 5,546,343 A | * | 8/1996 | Elliott | G06F 9/3879 365/189.04 |
| 5,956,274 A | | 9/1999 | Elliott et al. | |
| 5,960,211 A | * | 9/1999 | Schwartz | G06F 15/80 712/15 |

(Continued)

FOREIGN PATENT DOCUMENTS

| | | | | |
|---|---|---|---|---|
| JP | 2002207706 A | * | 7/2002 | G06F 15/16 |
| JP | 2007108913 A | * | 4/2007 | |

OTHER PUBLICATIONS

Cojocaru, Christian. "Computational RAM: implementation and bit-parallel architecture." Thesis. Carleton Univeristy, Ottawa, Canda. (1996): 179 pages.

(Continued)

*Primary Examiner* — Cheng Yuan Tseng
(74) *Attorney, Agent, or Firm* — Perry + Currier Inc.

(57) ABSTRACT

A system and method for enhancing C*RAM, improving its performance for known applications such as video processing but also making it well suited to low-power implementation of neural nets. The required computing engine is decomposed into banks of enhanced C*RAM each having a SIMD controller, thus allowing operations at several scales simultaneously. Several configurations of suitable controllers are discussed, along with communication structures and enhanced processing elements.

28 Claims, 18 Drawing Sheets

(56) References Cited

U.S. PATENT DOCUMENTS

| | | | |
|---|---|---|---|
| 6,279,088 B1 | 8/2001 | Elliott et al. | |
| 6,560,684 B2 | 5/2003 | Elliott et al. | |
| 6,803,782 B2 * | 10/2004 | Koob | H03K 17/693 |
| | | | 326/38 |
| 6,806,737 B2 | 10/2004 | Sung et al. | |
| 7,046,522 B2 | 5/2006 | Sung et al. | |
| 7,155,581 B2 | 12/2006 | Elliott et al. | |
| 10,175,839 B2 | 1/2019 | Srivastava et al. | |
| 10,331,282 B2 | 6/2019 | Srivastava et al. | |
| 2006/0155955 A1 | 7/2006 | Gschwind et al. | |

OTHER PUBLICATIONS

Elliott, D. G., Computational RAM, a memory-SIMD hybrid (Doctoral dissertation, National Library of Canada). University of Toronto. 1998. 191 pages.

Le, Thinh Minh. Computational RAM implementations of vector quantization for image and video compression. University of Ottawa (Canada), 1995. 150 pages.

Bouknight, Wendell J., et al. "The illiac iv system." Proceedings of the IEEE 60.4 (1972): 369-388.

Elliott, Duncan G., W. Martin Snelgrove, and Michael Stumm. "Computational RAM: a memory-SIMD hybrid and its application to DSP." Custom Integrated Circuits Conference, 1992., Proceedings of the IEEE 1992. IEEE, 1992.

ISA/CA, International Search Report and Written Opinion, dated Nov. 20, 2018, re PCT International Patent Application No. PCT/IB2018/056687.

Koob, John C., et al. "Design of a 3-D fully depleted SOI computational RAM." IEEE Transactions on Very Large Scale Integration (VLSI) Systems 13.3 (2005): 358-369.

Le, T. M. Snelgrove, W. M., & Panchanathan, S. (Mar. 1998). SIMD processor arrays for image and video processing: a review. In Multimedia Hardware Architectures 1998 (vol. 3311, pp. 30-42). International Society for Optics and Photonics.

Park, Jong Won. "Multiaccess memory system for attached SIMD computer." IEEE Transactions on Computers 53.4 (2004): 439-452.

Elliot, Duncan, et al. "Computing RAMs for media processing." Multimedia Hardware Architectures 1997. vol. 3021. International Society for Optics and Photonics, 1997.

Loucks, W. M et al., "VASTOR: a microprocessor based associative vector processor for small scale applications." Proc. of the 1980 International Conf. on Parallel Processing. 1980.

"Yeap, T.H., "Design of a VASTOR Processing Element Suitable for VLSI Layout", Dissertation, Toronto, 1984".

* cited by examiner

SYSTEM AND METHOD FOR ENERGY-EFFICIENT IMPLEMENTATION OF NEURAL NETWORKS

CROSS-REFERENCE TO RELATED APPLICATIONS

This application claims the benefit of U.S. provisional application Ser. No. 62/463,318, filed Feb. 24, 2017, which is incorporated herein by reference.

FIELD OF THE INVENTION

The present invention relates to a system and method for energy-efficient implementations of neural networks.

BACKGROUND

It is desirable to implement artificial intelligence calculations in an energy-efficient manner. In particular, "deep learning" or "neural net" techniques can benefit from low-power implementations. Low-power implementations permit application inter alia to mobile or isolated devices, where battery consumption is key to success, or at large scale. Deep learning has proven to be a powerful technique for performing functions that have long resisted other artificial intelligence approaches: for example but without limitation recognition of objects in cluttered images, speech understanding and translation, medical diagnosis, gaming and robotics. Deep learning techniques apply many layers (hence "deep") of neural nets that are trained (hence "learning") on the tasks of interest; once trained they perform "inference", inferring from new input data and output consistent with what they have learned. "Neural nets" perform computations analogous to the operations of biological neurons, typically computing weighted sums ("dot products") and modifying the results with a memoryless nonlinearity; but more general operations including memory, multiplicative nonlinearities, "pooling" are also required.

The computations involved in deep learning, like computations in general, can be seen as an interplay of memory and processing elements. Memory is required for the input data, the weights of weighted sums, the intermediate results passed between layers, control and connection information, and other functions. Data in memory is processed in processing elements ("PEs") (for example the CPU of a general-purpose computer, the tables of a Turing machine or in the processors of a graphics processor) and returned to memory.

In conventional computer architectures, the power consumption due to physically moving data between memory and processing elements is material and frequently the dominant use of power. This power consumption is typically due to the energy required to charge and discharge the capacitance of wiring, which in turn is roughly proportional to the length of the wiring and hence to distance between memory and processing elements. It is therefore desirable to minimize this distance.

Elliott98 is a doctoral thesis that teaches "pitch-matching narrow 1-bit [processing elements] to the memory and restricting communications to one-dimensional interconnects", which reduces distance between memory and processing elements to the order of a micron, where the chip-to-chip distances required by conventional computer systems are in the millimeters or even centimeters—thousands or tens of thousands times worse. Elliott98 summarizes earlier work dating back to academic work by Loucks, Snelgrove and Zaky dating back to "VASTOR: a microprocessor-based associative vector processor for small-scale applications," Intl. Conf. on Parallel Processing, pp. 37-46, August 1980. Elliott named this technology "C*RAM", for "Computational Random Access Memory".

Elliott98 and its related publications detail possible designs for the extremely simple processing elements required for pitch matching, including circuits required for one-dimensional communications. The prior art discusses slightly loosening the pitch-matching constraint from a one-to-one correspondence of memory columns with PEs, for example allowing each PE to occupy the width of four memory columns. This reduces the number of PEs, but may be necessary or practical for very dense memories.

U.S. Pat. No. 5,546,343 discloses the use of a multiplexer as an arithmetic and logic unit (ALU) operable to implement any function whatever of three bits of state of a processing element.

Cojocaru95 further teaches grouping one-bit processing elements so as to allow multi-bit calculations, adding specialized hardware to accelerate binary arithmetic, and adding registers to reduce the need for memory access.

Yeap84 is a Master's thesis describing suitable one-bit processing elements for C*RAM.

Le95 is a Master's thesis teaching algorithms suitable for image and video compression on C*RAM.

Prior art C*RAM implementations are deficient for low-power deep learning applications in several respects. Their one-dimensional communication makes it difficult to deal with large two-dimensional images having many channels; their eight-bit opcode is unnecessarily large and therefore power-hungry for common arithmetic operations; substantial chip area is occupied by the opcode and communications buses; processing elements cannot perform permutations or related mappings, nor table lookups or operations that vary from processor to processor; they have had off-chip controllers, which consume substantial power in communicating with the C*RAM proper; and they have been pure SIMD (Single Instruction stream, Multiple Data stream) devices, which handle consistent operations on large datasets well but which cannot share their processing resources when several smaller tasks are required.

SUMMARY OF THE INVENTION

It is an object of the present invention to provide architectural improvements which obviate, or mitigate, at least one disadvantage of the prior art. In particular, it is desired to improve C*RAM to handle large numbers of dot-product and related neural-net computations with flexible low-resolution arithmetic, power-efficient communications, and local storage and decoding of instructions and coefficients.

In one aspect of the invention, a SIMD controller is placed at one end of a bank of memory. In one embodiment this memory is a static random-access memory (SRAM) implemented in a logic process, having row-select lines driven by the controller so that each C*RAM processing element can read from or write to its corresponding bit of SRAM. The controller also drives control lines and responds to data from the memory row. The controller is designed to match the height of the C*RAM bank, so that banks of this controlled C*RAM may be repeated in the column direction. Other types of memory may be used, such as dynamic RAM, ferroelectric RAM, magnetic RAM or a combination, as long as they have row addressing that simultaneously enables corresponding bits on their columns and as long as it is possible to integrate processing elements and controllers with the memory in a pitch-matched layout.

Preferably, the controller's instruction memory can be loaded from the associated bank of C*RAM. This can be done through the data bus of prior-art C*RAM which is separate from the bus driving general C*RAM opcodes. In the current invention the data bus and the bus driving general C*RAM opcodes can be shared, saving space and thereby making larger arrays possible.

Where a multiplexer is used to implement an ALU, it may be used as a bidirectional device, allowing a PE to drive any one of the global control bus bits, with the memory and register data used to select which bit to write. When dynamic or similarly asymmetric logic is used, it is permissible to have plural PEs driving the same global control bus bit, leading to a "wire-AND" function in which the bit is high unless any PE pulls it low. This kind of function has been shown to be useful for search algorithms.

If the bus is further provided with a latch, for example a sense amplifier having its power supply or ground clocked, then PEs can write values on one cycle and read them on another, which can mean writing and reading different bits. In this way it is possible to permute or distribute data in various ways, for example allowing data-dependent shifts, which are useful in logarithmic and floating-point arithmetic. It is also contemplated to write data on one cycle and then use the bus to provide an opcode on a following cycle, thus providing data-dependent instruction execution.

Given this disclosure, one skilled in the art will note that PEs can be designed in which read/write control is locally provided, thus making single-cycle data permutations and similar operations possible even without a latch.

Buses, like the data bus (if any) or a bidirectional control bus, may be segmented with series switches at every PE or more usefully at every N PEs, where N is chosen to maximize performance on expected tasks. There is a tradeoff: having many segments gives a pipelining advantage, in that independent data transfers may be happening in each segment when segmenting switches are OFF; but when it is desired to send data a long distance through many ON switches, their resistance will make bus charging slower.

One way to manage the tradeoff in choosing how finely to segment a bus is to have a plurality of buses with different N. For example, one may lack segmentation switches altogether, making it similar to the opcode portion of the prior art global control bus, except that its bidirectionality allows it to be used to communicate results from PEs back to the SIMD controller; while another bus may be segmented every 32 PEs: in an implementation with 8192 PEs in a row this would allow for 256 independent segments.

Switches controlling bus segmentation may be controlled either globally, by the SIMD controller, or locally by a register in the PE.

These features may be usefully combined: in particular, a latched and segmented bus allows each segment to do a local data-dependent permutation. It can also be used to "pump" data along the bus, by precharging certain segments and then closing the segmentation switch so that latched sections can drive precharged ones. Alternatively the segmentation switches can be enhanced to act as latches or as half-latches, so that the segmented bus may be used directly as a shift register.

The above describes improvements to C*RAM that provide a single controlled C*RAM bank. By making the controller approximately match the C*RAM bank height we get a structure that allows multiple controlled C*RAM banks to be placed in a space-efficient manner, one above the other, tiling in the column direction. This allows an approximately square array to be made, which can be advantageous for packaging, even when individual banks are very long (row dimension) in relation to their height (column dimension), which is desirable for many practical RAM circuits and for having a large number of processors amortizing the area and power costs of a single SIMD controller. Prior art (e.g. Elliott's PhD thesis) did stack rows (albeit without controllers), but explicitly taught limiting communications to the row direction only; it is contemplated that this was a result of metal-layer limitations in memory manufacturing technologies. These older C*RAM structures extended one-dimensional communication around the ends of rows to form one large virtual row, or used existing column multiplexers to allow communication between rows. These one-dimensional constraints are undesirable for processing large images, which are best mapped (to reduce or minimize communications distance and hence power) to a roughly square area of the system.

The present invention includes strong two-dimensional communications features to controlled C*RAM. In one aspect, nearest-neighbor communications are provided between corresponding PEs in adjacent rows, where registers can optionally be loaded from the ALU above or below each PE, just as in the prior art it is known to load them from ALUs to the right or left. In another aspect, a column-direction bus connects PEs in corresponding columns. Like the row buses discussed above, these column buses can be implemented with bidirectional multiplexers, can be segmented, can be latched, or can be arranged as a shift register; and a plurality of column buses may be provided having different degrees of segmentation. They can also be used for data permutations. PEs having both row and column direction buses can switch data between them by reading in one dimension and writing in the other.

The prior art (e.g., U.S. Pat. No. 5,546,343) posited a single off-chip SIMD controller; but at the scale of modern integrated circuits, where millions of processors may be on each chip, this makes for too coarse a scale of control. In contrast, various embodiments of the present invention have a SIMD controller for each bank. Further, it is contemplated that this one-to-one correspondence can be somewhat adjusted in various embodiments (e.g. one controller for two banks of C*RAM or vice versa) to realize any suitable and efficient balance of high PE utilization (which drives towards having more controllers so that smaller problems can be handled) and good area and power efficiency (which drives towards reducing the number of controllers to limit duplication). In an exemplary small embodiment 8192 64-bit columns are provided with PEs in each row, sharing a single SIMD controller. For example, 128 of these controlled-C*RAM banks can be provided, so that there are 8192 bits in each column for a square array having 1,048,576 processors and 128 controllers.

One function of a SIMD controller is to fetch instructions as needed and decode them to provide the control lines required by the PEs and their associated buses, and the row addresses needed to select memory data for the PEs. It may be desirable during execution to fetch instructions from a memory separate from the C*RAM, because the C*RAM rows are generally much longer than an instruction; and also because this makes for a "Harvard architecture" in which instruction and data (C*RAM) fetches occur in parallel. However, because some computations are data-heavy while others are instruction-heavy, it is desirable to be able to load instruction memory from C*RAM.

In one embodiment, therefore, an instruction decoder is provided on one side with an instruction memory and on the other with a row of C*RAM. Since the same memory circuits and layouts may be used for both functions, the heights of the controller and its associated C*RAM can readily be made to match.

The SIMD controller addresses its instruction memory through a program counter, decodes what it reads and uses this information to drive the C*RAM. Pipelining can be used to avoid having to wait for instruction read and decode before execution. In one embodiment the instruction set includes "OP" instructions that drive opcodes and load registers; JMP and JSR instructions that manipulate the program counter; address registers to allow indirect and indexed addressing; looping constructs (such as fixed-length loops) and conditional jumps.

In one embodiment the conditional jumps are conditioned on data from row-direction buses or from the PE nearest to them.

Even when different SIMD controllers are running different code, they may need to synchronize, for example so that intermediate results that their associated C*RAM banks have calculated can be shared using column-direction interconnect. It is therefore desirable that they have nearest-neighbor interconnect (in the column direction, because that is how the banks are tiled) to which they can write control bits and which they can use to manage conditional execution.

When vectors of data are being processed that are larger than a single C*RAM bank, it may be desirable to have multiple controllers issuing the same opcodes and controls. This could be done by replicating instructions in the memories of all the relevant SIMD controllers, and using the synchronization described above to keep them locked together, but this may not be the most power-efficient approach because plural controllers would be redundantly decoding the same instruction. It would also replicate state of any address and control registers, obviating or reducing the possibility of code that uses the extra registers for more complex program logic. In one embodiment, therefore, a column-direction bus is provided, operable to allow one controller to act as a master and the others to slave to it. The column direction bus may also advantageously be used to allow the master to use registers in its slaves. The column-direction bus may be segmented, so that multiple groups of controllers may be independently operated in this way. Controllers in a group can take turns acting as master, allowing larger programs to fit in instruction memory because it is shared rather than replicated.

Neural nets typically require storage of a large number of coefficients: on the order of 250 million for the well-known recognition algorithm AlexNet. This may be difficult for the 64 Mbit embodiment mentioned above, though there are smaller networks that would fit; but even with a smaller network memory should be used efficiently. It is therefore contemplated to store coefficients in compressed form (for example, storing the common special case of a zero coefficient in a single "0" bit). Decompression can be done in software in C*RAM, though its inherent variable-length nature may make the code difficult; but in one embodiment it is done by a separate component (a "decompression engine") of the SIMD controller which reads a string of variable-length compressed numbers and produces them in decompressed form.

Coefficient compression is useful for more than just saving space: for example if a coefficient is zero then the associated multiply-add step of a dot product can simply be skipped, saving both time and power. A decompression engine can, therefore, return code rather than, or as well as, decompressed numbers. For example, it can return the address of a subroutine that efficiently handles the special case of the given coefficient (e.g. zero, as discussed above, or a pure bit shift) together with a register value that serves as an argument to this subroutine (e.g. the number of bits to shift).

The decompression engine can share the instruction memory with the decoder, or have a separate memory of its own. In the large-vector case that multiple controllers are running the same code with the same coefficients, one controller can be doing decompression while another acts as master.

These and other aspects of the present invention will be discussed in further detail below.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

The present invention relates to a system and method for performing a wide variety of neural-net operations in a massively parallel fashion, where processing elements are embedded in memory so as to reduce or minimize the energy expended in transferring data back and forth between processor and memory.

The present invention provides enhanced communication and control capabilities to C*RAM. The technique is applicable both to prior art C*RAM applications, such as video processing, and to neural net computations. It can be implemented either in logic or memory processes, or in logic processes with post processing that adds memory capability.

Figure 1:
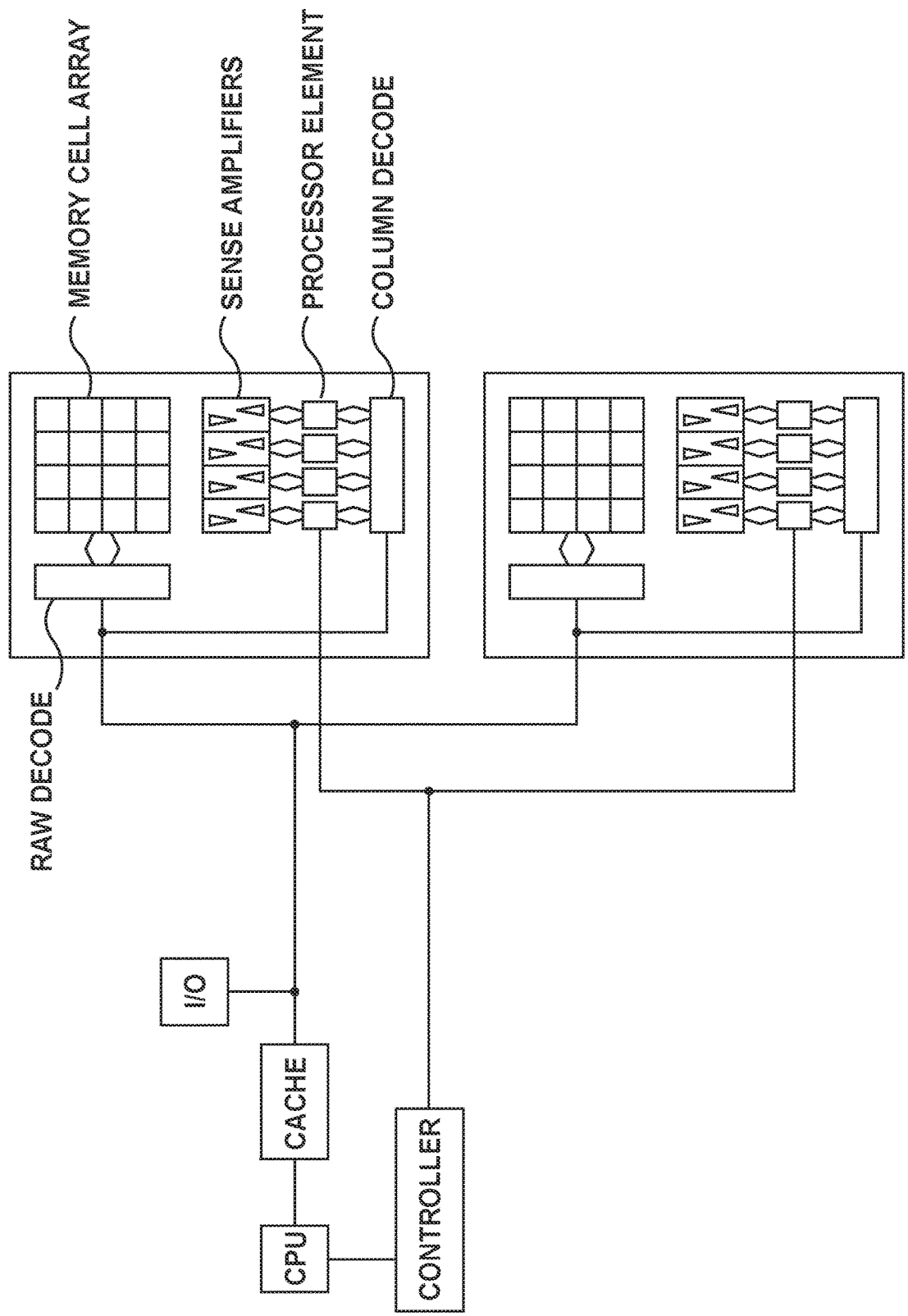
FIG. 1 shows a schematic representation of a prior art computer system in which processing elements are embedded in memory.

FIG. 1 shows a prior art computer system in which some memory devices include processors embedded in memory according to U.S. Pat. No. 5,546,343.

Figure 2:
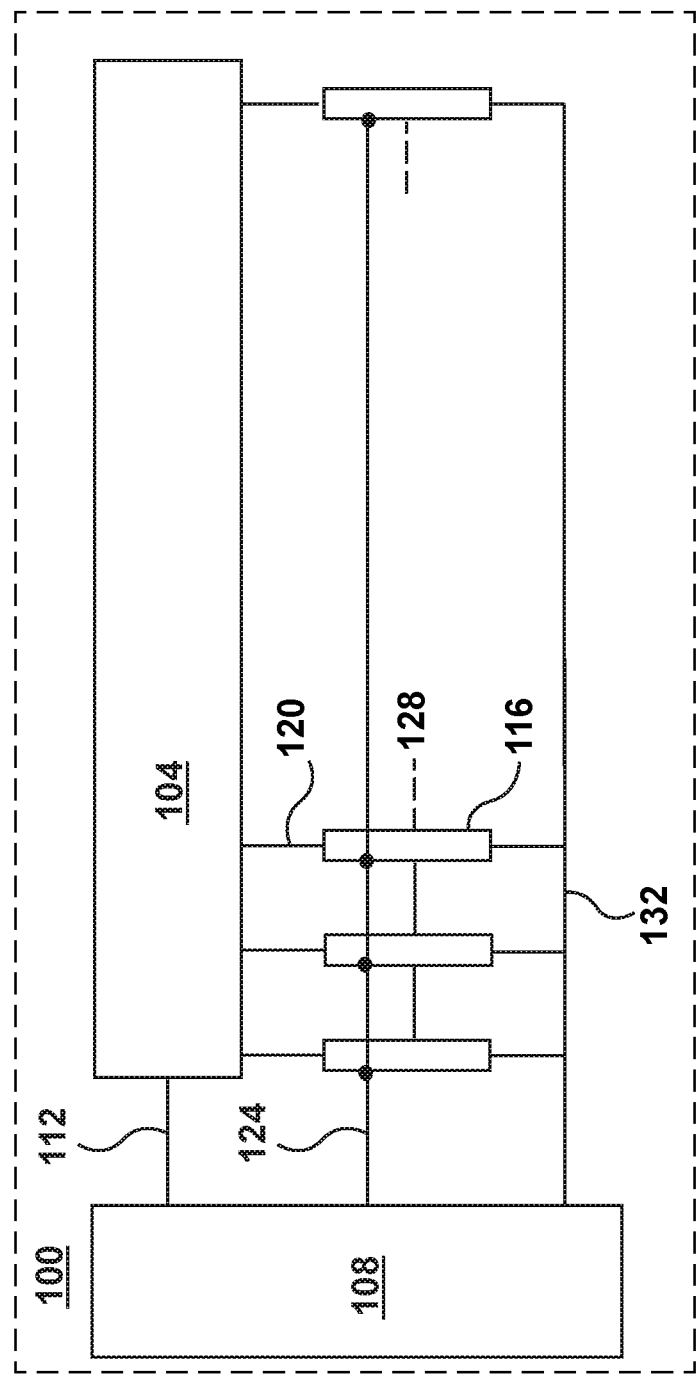
FIG. 2 shows a block-level representation of a row of processors embedded in memory according to the present invention.

FIG. 2 shows a bank 100 of an enhanced memory device including processors according to the present invention. A row 104 of memory is addressed by a SIMD controller 108 through row select lines 112, causing selected bits in each column of memory row 104 to be available to processing elements 116 through bit lines 120. Processing elements execute operations according to operation codes provided by SIMD controller 108 through operation bus 124. Processing elements 116 may communicate with neighbors through left/right shift lines 128. Further, processing elements 116 may communicate with each other or with SIMD controller 108 through row bus 132. In an alternative embodiment, row bus 132 may carry opcode information to complement operation bus 124 for certain operations.

Any number and arrangement of row busses can be used, and various row busses may have different degrees of segmentation.

A row of memory 104 can be implemented as a plurality of physical rows sharing row select lines 112. A single physical row of memory can be split into independent rows 104 of memory, for example by driving one half of the physical row from the left and the other half from the right. In this disclosure, the term "C*RAM bank" is used to refer to all memory rows sharing an address and hence logically or electrically sharing row select lines 112, and the term "controlled C*RAM bank" is used to the combination of a C*RAM bank with a SIMD controller 108.

Figure 3:
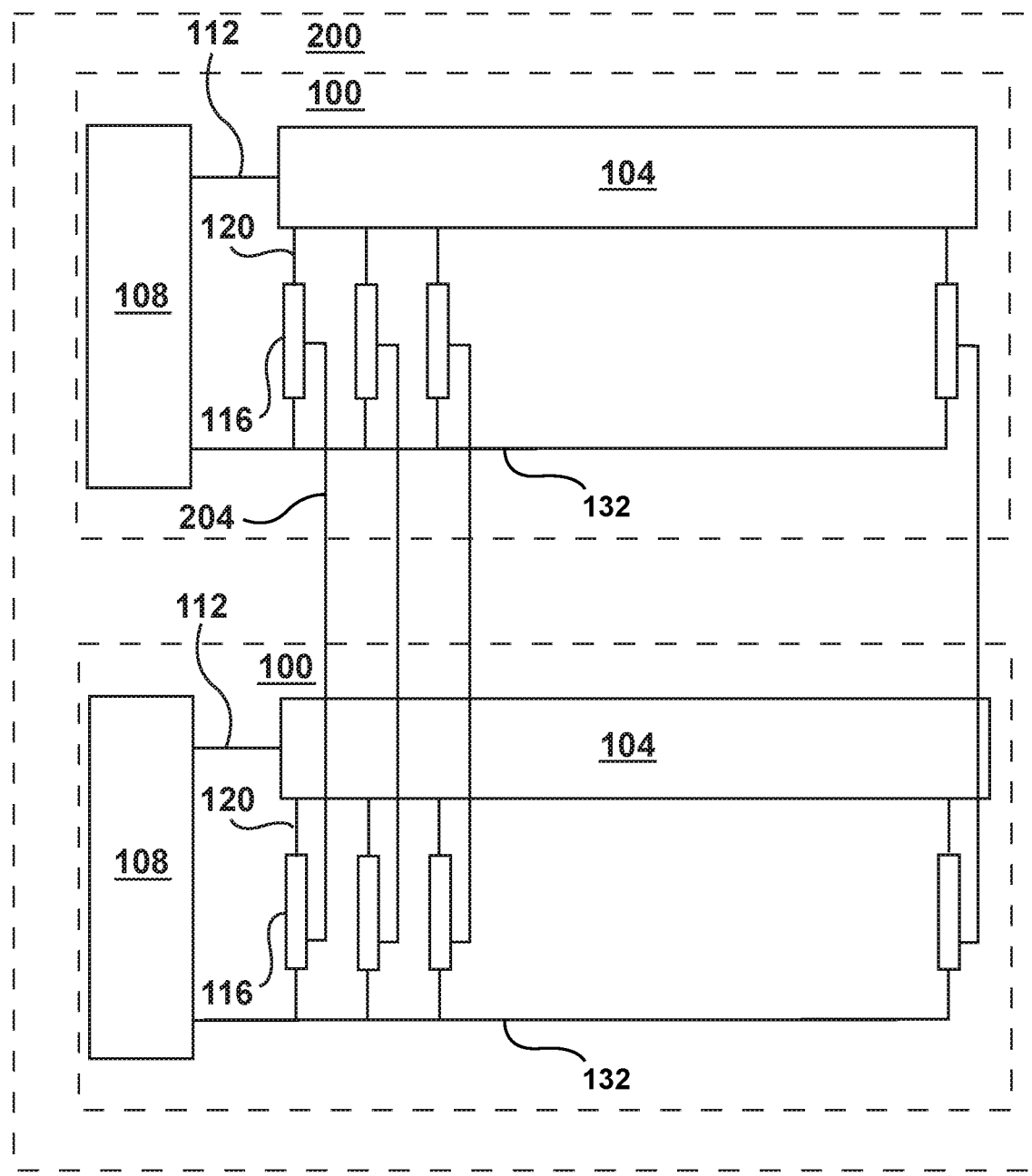
FIG. 3 shows a block-level representation of a plurality of rows of processors embedded in memory according to the present invention, the rows being connected by column-direction buses.

FIG. 3 shows a plurality 200 of banks 100 communicating through column buses 204. Any suitable number of banks 100 can be arranged in this manner.

Figure 4:
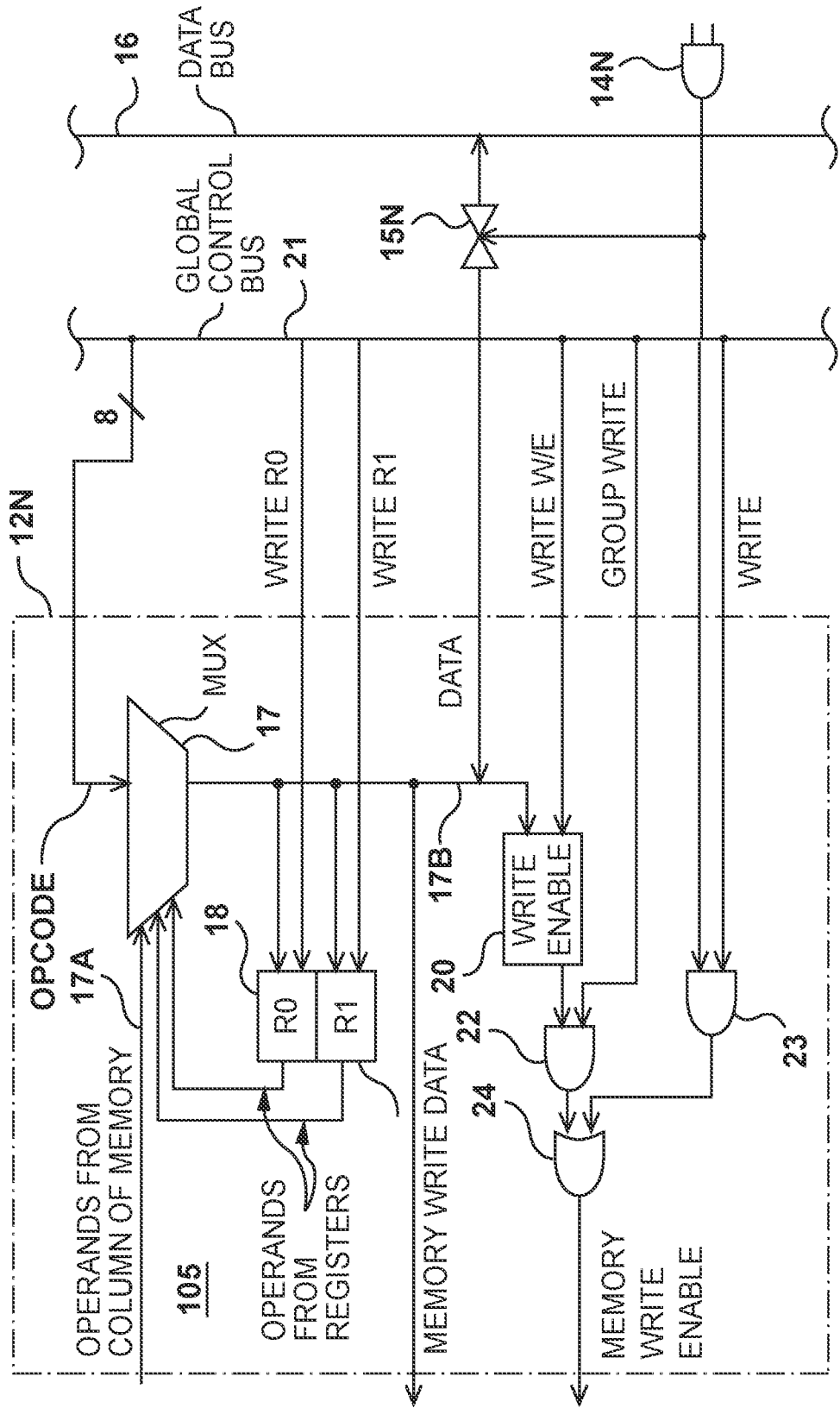
FIG. 4 shows a prior art one-bit processing element adapted to general-purpose processing of one-bit values.

FIG. 4 shows a prior art processing element adapted to general-purpose processing of one-bit values. Processing element 12N can be used as a processing element 116 in the bank 100 of FIG. 2. Processing element 12N contains an arithmetic and logic unit (ALU) implemented as an 8-1 multiplexer 17. The output line of multiplexer 17 is connected to the data inputs of registers 18 ("X") and 19 ("Y") as well as to write-enable register 20 ("WE") and to the bit-write 17B of an associated column 105 (FIG. 5) of memory 104 (FIG. 2). The bit-read output 17A of said associated column 105 of memory 104, together with the data outputs ("operands from registers") of registers 18 and 19 serve to address multiplexer 17 and thus to select which of eight opcode lines of its input from global control bus 21 will be connected to its output. In this way multiplexer 17 serves to calculate an arbitrary function of the bit values at 17A, 18 and 19, said arbitrary function being defined by the truth table represented by the eight-bit value on global control bus 21.

The purpose of write-enable register WE is to allow a sort of conditional execution: by disabling writes in some PEs but not others it is possible to execute the same instructions in all PEs but have the results be irrelevant in the disabled PEs. Thus an "if COND then IF-BLOCK else ELSE-BLOCK" construct is handled by enabling writes by computing WE=COND in all PEs; then executing IF-BLOCK; then inverting WE in all PEs and executing ELSE-BLOCK.

It is contemplated that the number of registers controlling the multiplexer 17 can be changed. The size of the truth table can be correspondingly changed, e.g. by adding a "Z" register and going to a 16-bit opcode.

Global control bus 21, in addition to providing the eight-bit truth table for the ALU, also provides clocking signals "Write X", "Write Y", "Write WE" to cause ALU data to be clocked into registers 18, 19 and 20. Bus 21 further provides control signals "Group Write" and "Write" which allow external input data to write to memory without use of the ALU. This external input data can be driven onto line 17B through switch 15N from, for example, 16-bit data bus 16. Data bus 16 may also be used to load registers 18 and 19 through this path.

Figure 5:
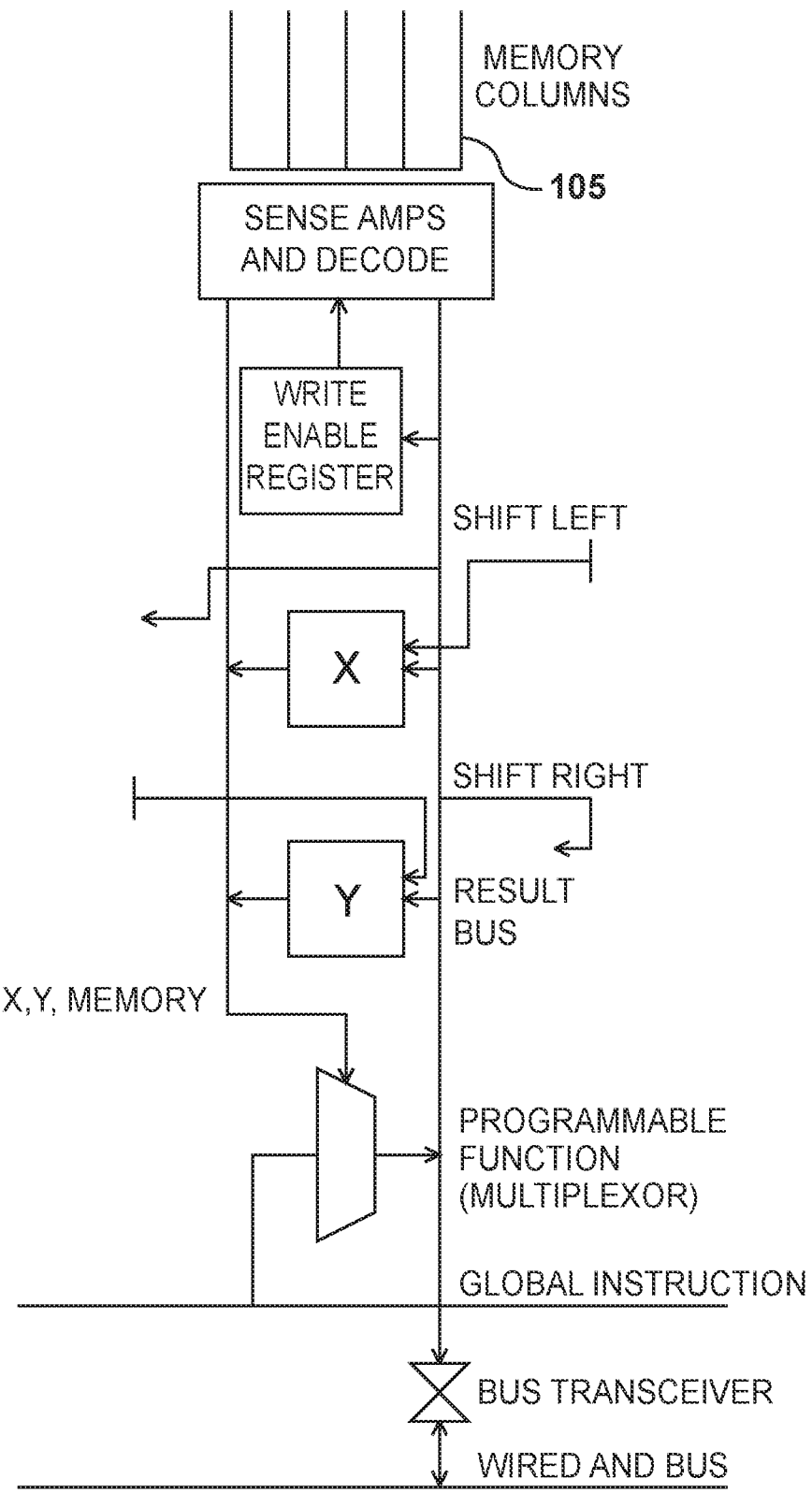
FIG. 5 shows a prior art one-bit processing element having nearest-neighbor communications in the row direction.

FIG. 5 shows a prior art one-bit processing element from [Elliott98] having nearest-neighbor communications in the row direction. This processing element can be used as a processing element 116 in the bank 100 of FIG. 2. This processing element adds secondary inputs and outputs to the X and Y registers, allowing each X register to be loaded from the output of the ALU to its right ("shift left") or each Y register to be loaded from the ALU to its left ("shift right") or both.

Figure 6:
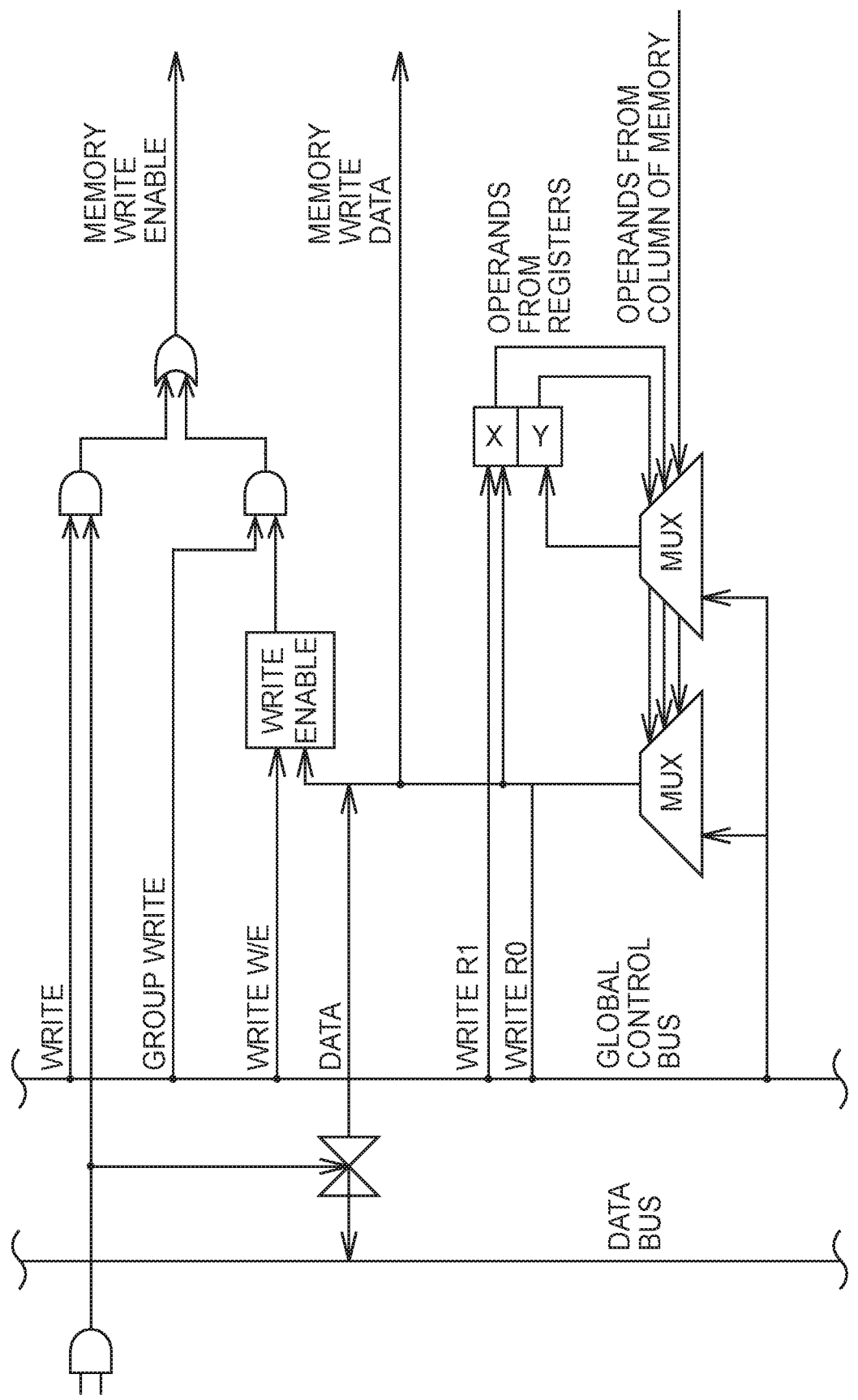
FIG. 6 shows a prior art one-bit processing element performing two operations per memory read.
Figure 7:
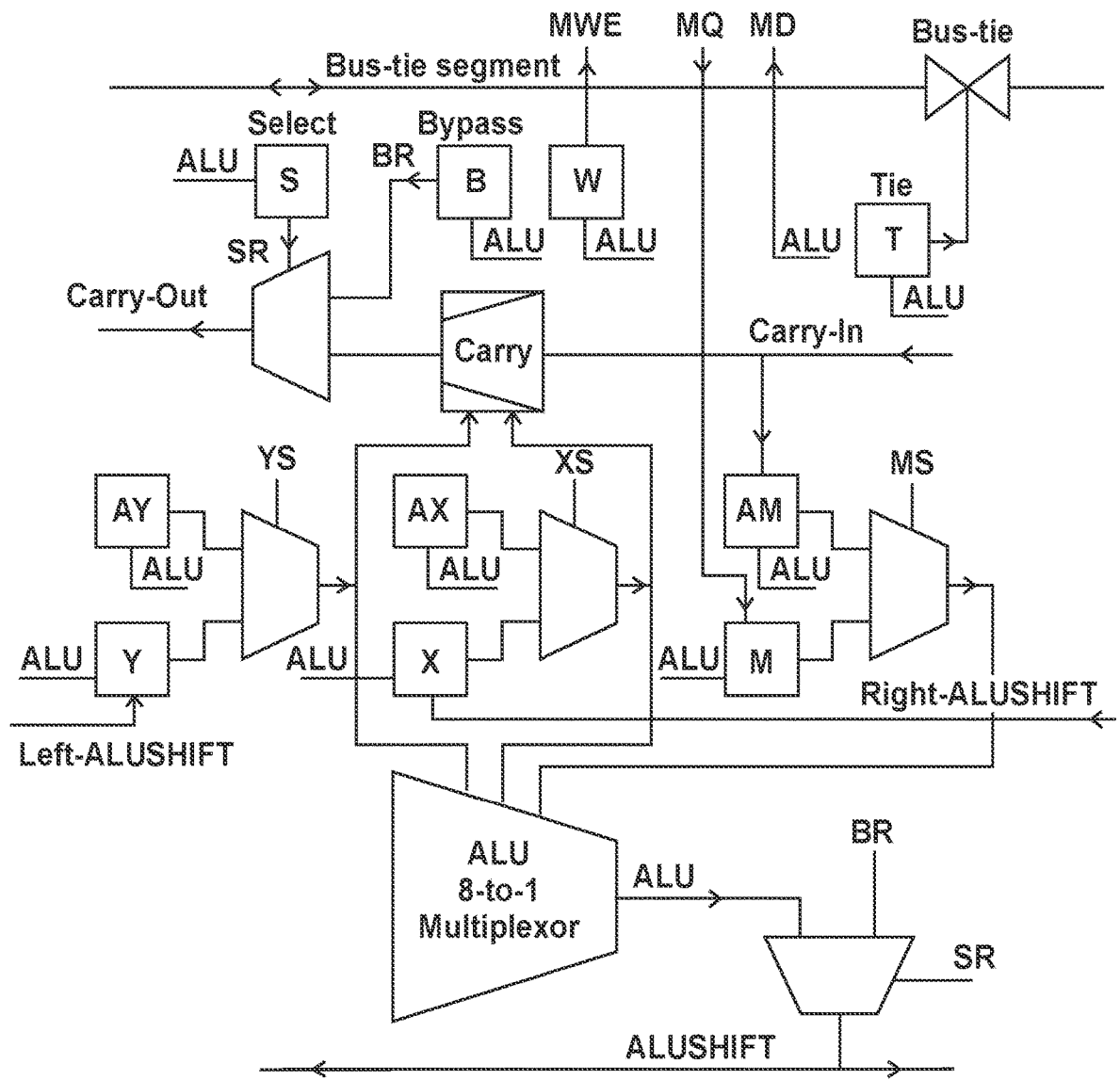
FIG. 7 shows a prior art multi-bit processing element with a carry generator enhancement for arithmetic and with reduced use of memory.

FIG. 6 shows a prior art (reproduced from FIG. 7 of U.S. Pat. No. 5,546,343) one-bit processing element performing two operations per memory read. This processing element can be used as a processing element 116 in the bank 100 of FIG. 2. The global control bus is doubled to a 16-bit width so that it can carry two 8-bit truth tables, and multiplexers 17C and 17D simultaneously compute the two functions of the three local state bits—X, Y and memory. Values for X and Y may be computed simultaneously.

FIG. 7 (from [Cojocaru95]) shows a prior art multi-bit processing element with a carry generator enhancement for arithmetic and with reduced use of memory. This processing element can be used as a processing element 116 in the bank 100 of FIG. 2. One notable feature is that the X and Y registers have been generalized to become register banks, in this case with two registers (e.g. X and AX) in each, and memory has been treated similarly as a type of register bank in which one register ("M" is replaced by a bit read from memory. Read-only bits can also be treated as registers in a register bank. For low-power applications it is desirable to cache data in low-power registers rather than repeatedly referring to the higher-power memory. Note that the left-right nearest-neighbor communication of FIG. 5 is also available in this structure.

A further enhancement here is the addition of the "Carry" block, having an input "Carry-in" from a processing element to the right ("right" may be replaced with adjacency in any direction, as long as consistency is maintained), which can be combined with data from X and Y register banks, and which generates a "Carry Out" which may optionally be passed to the next PE left. Registers S and B may be used to suppress carry propagation ("S") and to replace it with a given bit "B". If, for example, S is set to suppress carry propagation in every forth PE and to replace it with a "0", the effect is to create a system with N/4 4-bit PEs from a C*RAM with N single-bit PEs. The prior-art structure shown does not directly offer a path to store Carry-Out in the local PE, which could be desirable if, for example, it were desired to do 8-bit calculations four bits at a time in four-PE groups.

FIG. 7 also shows a prior art segmented bus, in which register T may be used to enable or disable a switch connecting adjacent bus segments labelled "Bus-tie segment". This allows a single bus to be cut into an arbitrary number of smaller local buses, whereas in FIG. 4 there is one large shared bus. Segmentation is a tradeoff between bandwidth—having many segments means that a lot of different data is in motion at any time—and communication distance—the segments do not allow distant PEs to communicate.

Figure 8:
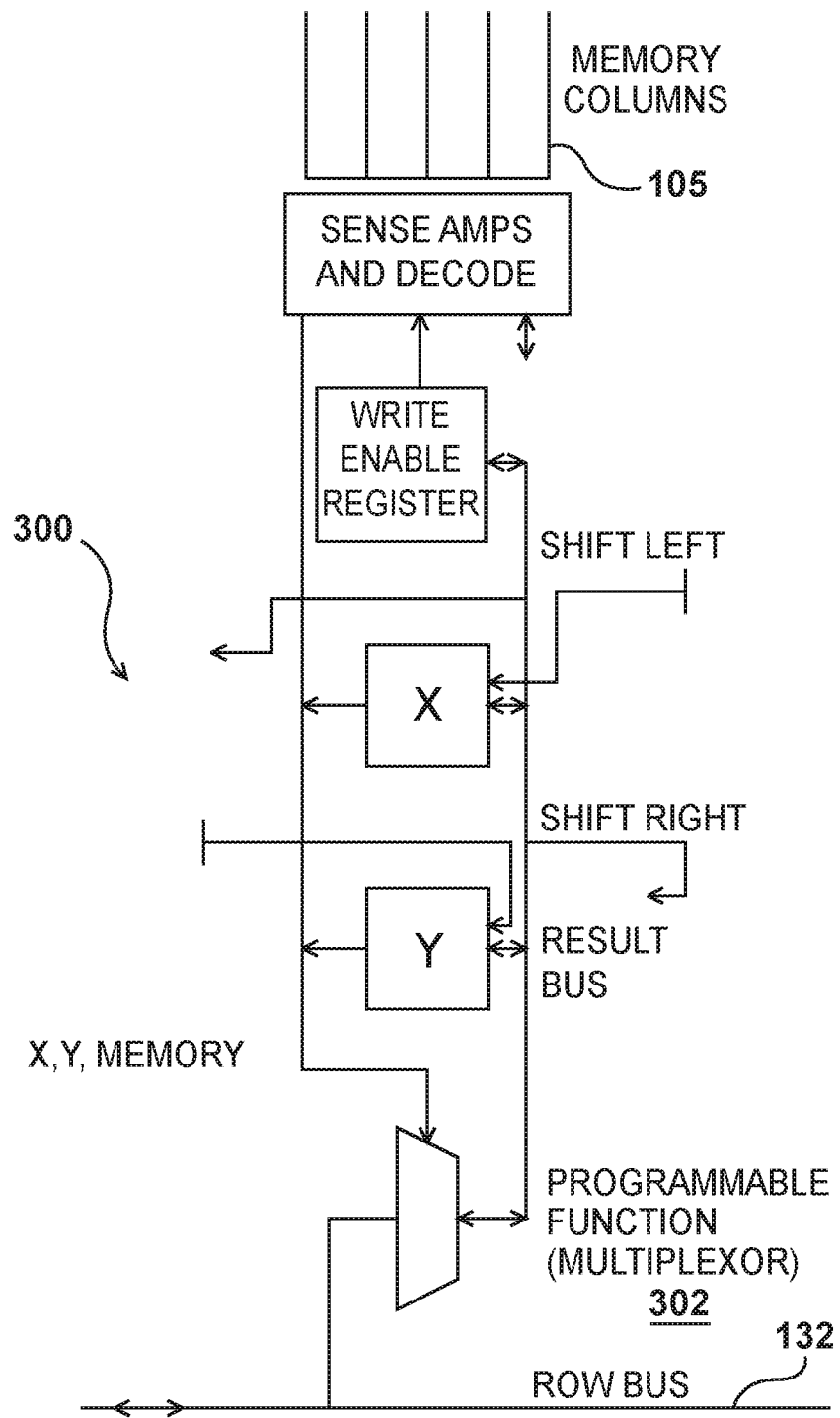
FIG. 8 shows a processing element according to the present invention in which an opcode multiplexer is enhanced to serve as a row-direction bus.

FIG. 8 shows a processing element 300 according to the present invention. The processing element 300 can be used as a processing element 116 in the bank 100 of FIG. 2. FIG. 4 and related description can be referenced for details of the processing element 300 that are omitted from the below.

The processing element 300 includes an opcode multiplexer 302 that is configured to serve as a row-direction bus. The multiplexer 302 is used for bidirectional communications. Since area-efficient multiplexers can be implemented with a tree of switches, this need not add complexity. X and Y registers (R0 and R1) are provided and are also bidirectional on the ports connected to the multiplexed side of the multiplexer 302. Tri-state and sense-amplifier styles of register can be used for the X and Y registers. In various other embodiments of the present invention, the bidirectional multiplexer 302 is combined with other features described herein, such as register banks, dual-operand or carry-enhanced PEs, carry suppression and so forth.

Making the multiplexer 302 bidirectional allows the data bus 132 to be eliminated, if space is at a premium, or supplemented if communications bandwidth needs to be improved.

The row-direction bus according to the present invention may be provided with a latch, which enables data permutation, local operations, and other advanced functions.

Figure 9:
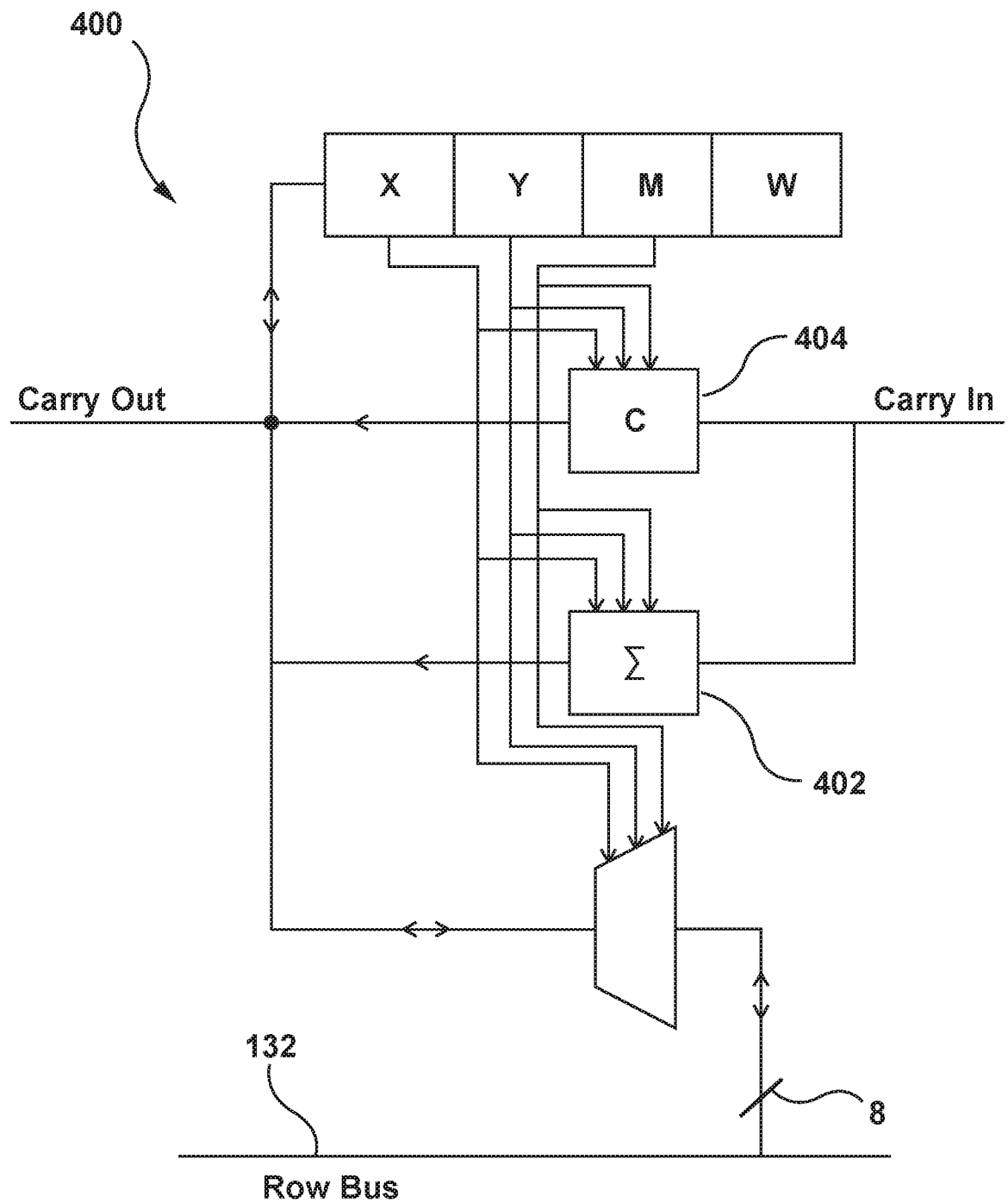
FIG. 9 shows a processing element according to the present invention having specialized sum and carry operations, allowing the row-direction bus to be simultaneously used for communications.

FIG. 9 shows a processing element 400 according to the present invention having specialized sum and carry operations, allowing the row-direction bus to be simultaneously used for communications. The processing element 400 can be used as a processing element 116 in the bank 100 of FIG. 2. A Σ (sigma) block 402 is operable to compute the sum bit of its three inputs X, Y and M. A carry block 404 is operable to simultaneously compute the carry bit. Both the sum and carry may be written back to any combination of X, Y, M (memory) and W (write-enable) registers, which may be implemented as memory banks. At the same time, the row bus 132 may either be read into X, Y, M or W or a single row bus line chosen by the triple X, Y, M can be driven from X, Y, M or W. Any of the registers can be implemented as register buses. Further, the arithmetic blocks can be driven and the multiplexer can be addressed by different registers from these register files. In addition, latching of the multiplexer address or arithmetic inputs can be provided. A row bus bit can be addressed independently of arithmetic operations.

Figure 10:
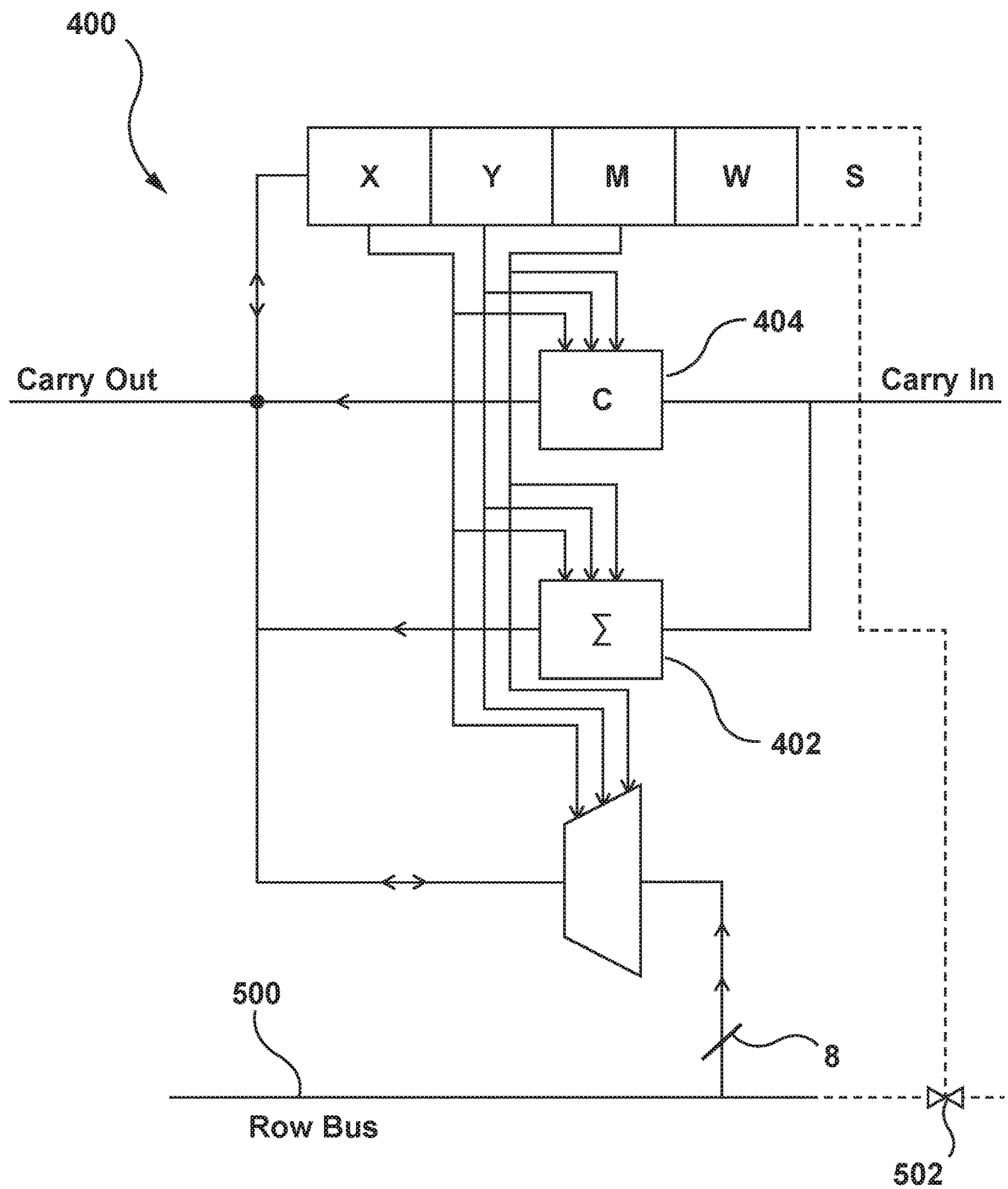
FIG. 10 shows a row-direction bus having segmentation switches.

FIG. 10 shows a row-direction bus 500 having segmentation switches 502. In one embodiment, the switches 502 are controlled by registers in associated PEs. In another embodiment, the switches 502 are controlled directly by the SIMD controller 108 (FIG. 2).

Figure 11:
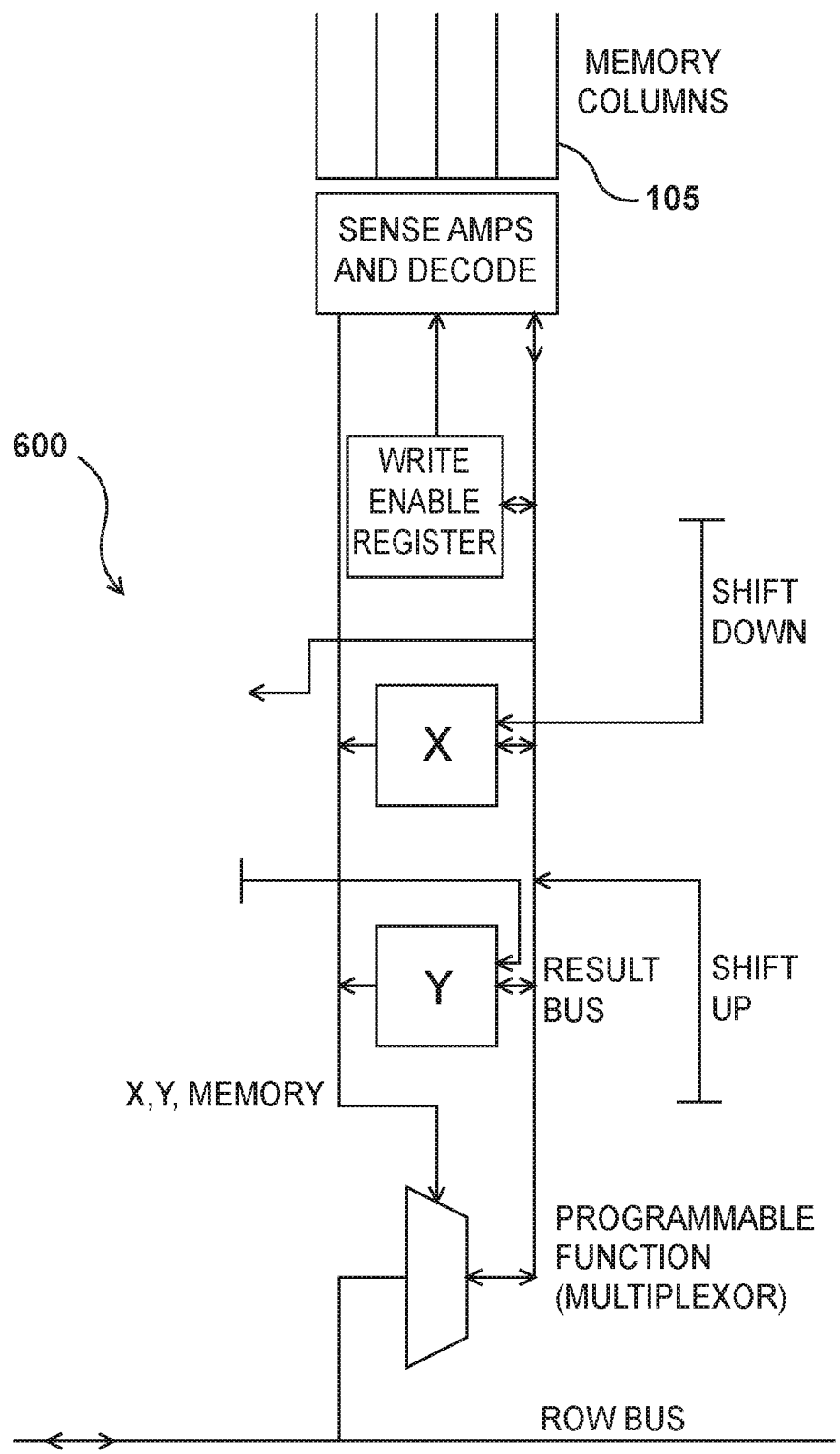
FIG. 11 shows a processing element according to the present invention having nearest-neighbor communications in the column direction.

FIG. 11 shows a processing element 600 according to the present invention having nearest-neighbor communications in the column direction. The processing element 600 can be used as a processing element 116 in the bank 100 of FIG. 2. Nearest-neighbor communications in the column direction can be combined this with row-direction nearest-neighbor communication. In one embodiment, X and Y are single registers and a 2:1 multiplexer selects whether registers X and Y pass data in the row or column direction. In another embodiment, X and Y are register banks, and different registers within the register banks X and Y can be set by neighbors in the row and column directions.

Figure 12:
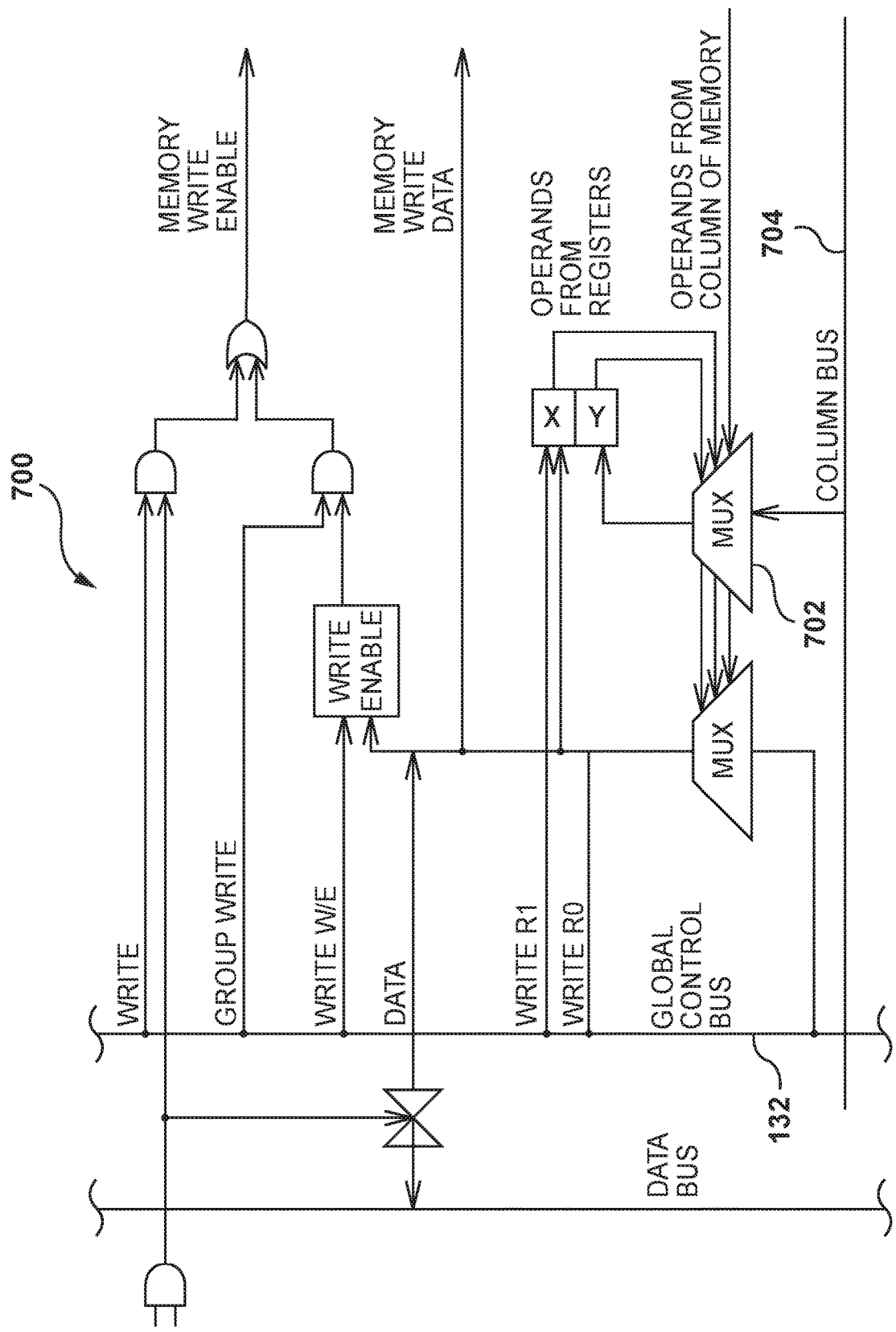
FIG. 12 shows a processing element having a second multiplexer connected to a column-direction bus.

FIG. 12 shows a processing element 700 having a second multiplexer 702 connected to a column-direction bus 704. The processing element 700 can be used as a processing element 116 in the bank 100 of FIG. 2. For the other elements in this figure, related description elsewhere herein can be referenced.

Figure 13:
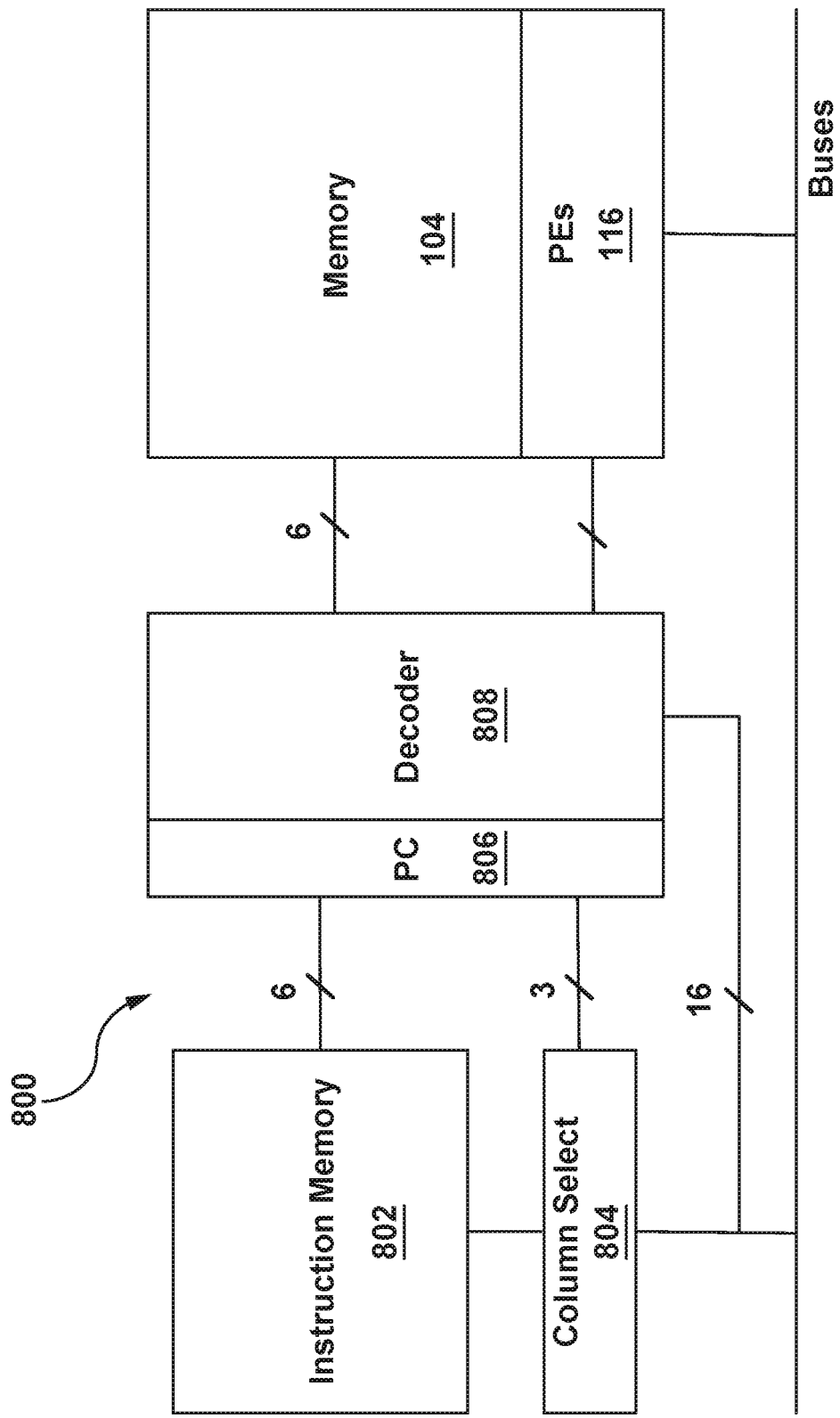
FIG. 13 shows a SIMD controller operable to drive row addresses and opcodes, and to load and save instructions in its associated row of memory.

FIG. 13 shows a SIMD controller 800 operable to drive row addresses and opcodes, and to load and save instructions in its associated row of memory 104. The SIMD controller 800 can be used as a SIMD controller 108 in the bank 100 of FIG. 2. The SIMD controller 800 includes instruction memory 802, a column select 804, a program counter 806, and a decoder 808. The decoder 808 decodes instructions and can be further include a decompressor configured to decompress instructions and/or data, which may be stored in compressed form to save memory.

Figure 14:
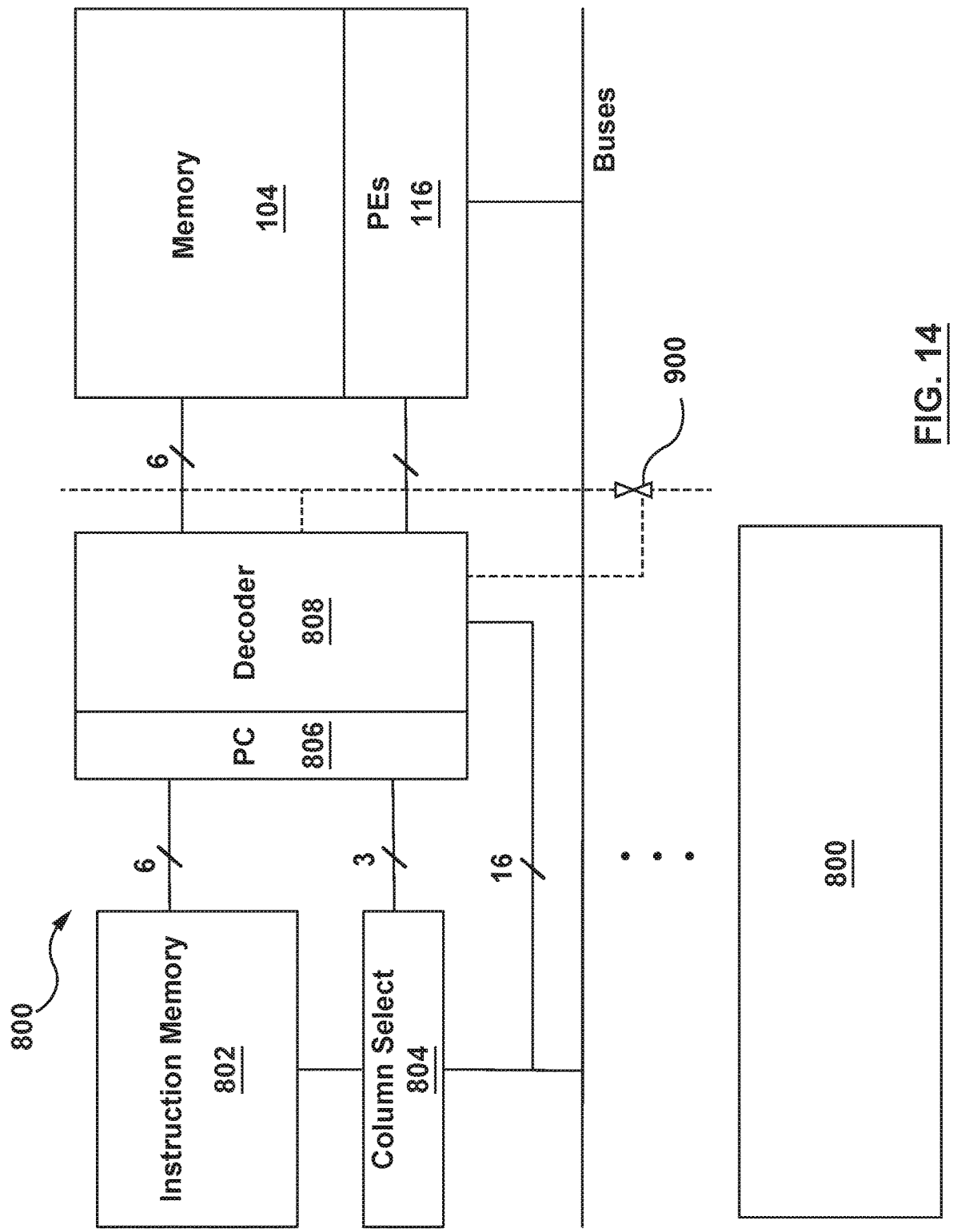
FIG. 14 shows a plurality of SIMD controllers interconnected by a column bus, each operable to control a bank of C*RAM and together operable to permit sharing of instruction memory.

FIG. 14 shows a plurality of SIMD controllers 800 interconnected by a column bus 900, each operable to control a bank of C*RAM and together operable to permit sharing of instruction memory.

Figure 15:
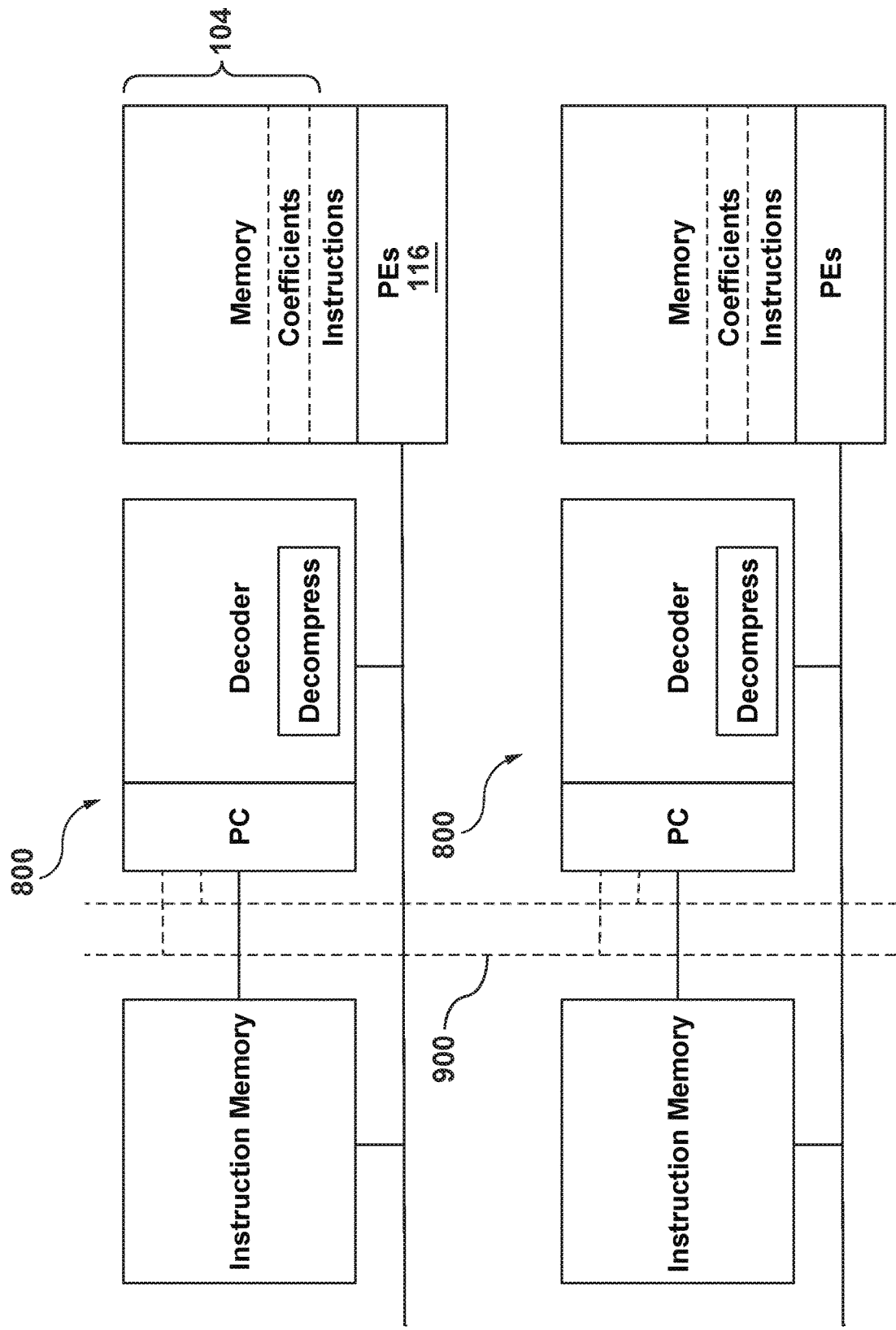
FIG. 15 shows a plurality of SIMD controllers, each further operable to decode compressed coefficient data and together operable to permit sharing of instruction memory and to reuse it as coefficient memory.

FIG. 15 shows a plurality of SIMD controllers 800, each further operable to decode compressed coefficient data and together operable to permit sharing of instruction memory and to reuse it as coefficient memory.

Figure 16:
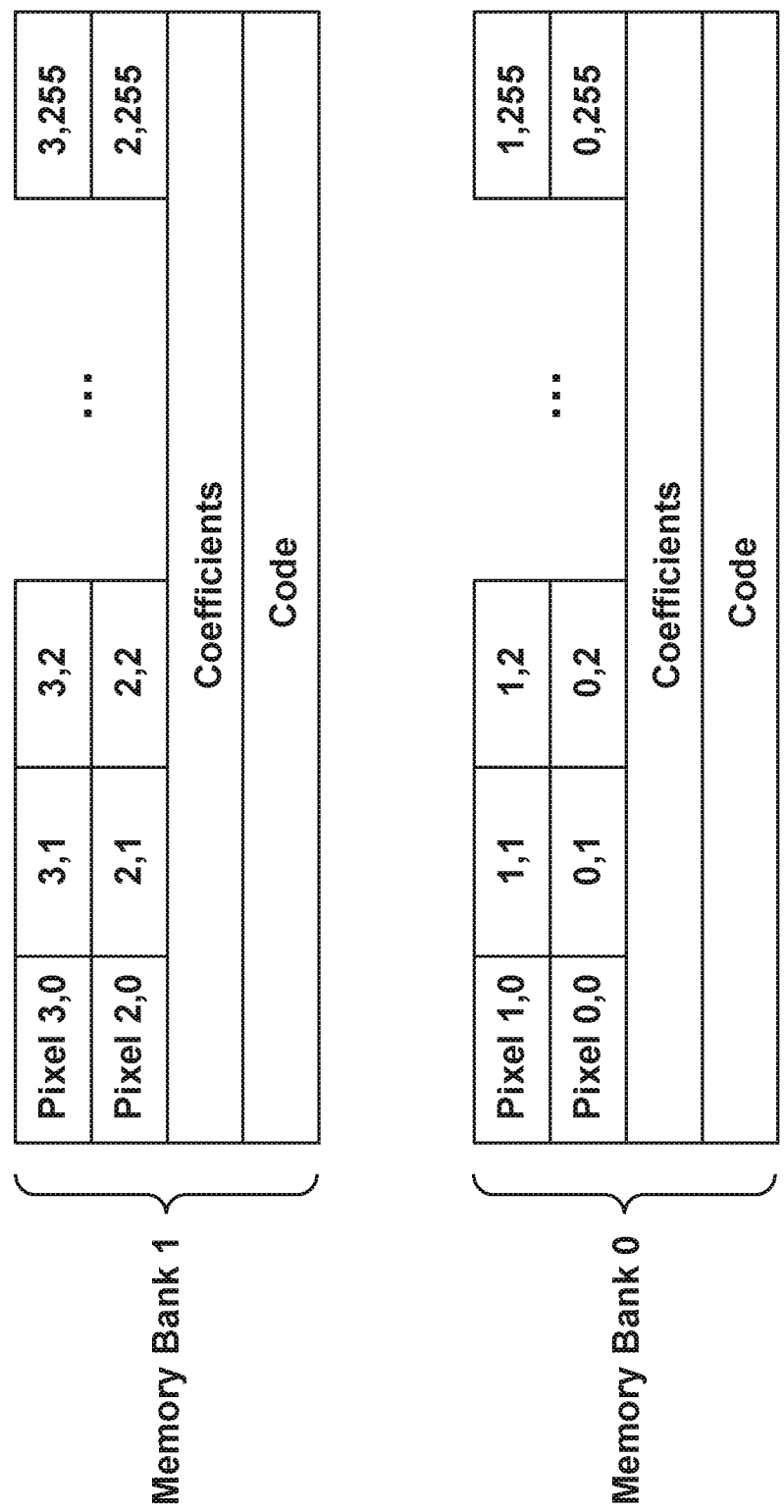
FIG. 16 shows an exemplary layout in memory of pixel data for an image and associated code and kernel output data for a first layer of a neural net.

FIG. 16 shows an exemplary layout in memory of pixel data for an image and associated code and kernel output data for a first layer of a neural net.

Figure 17:
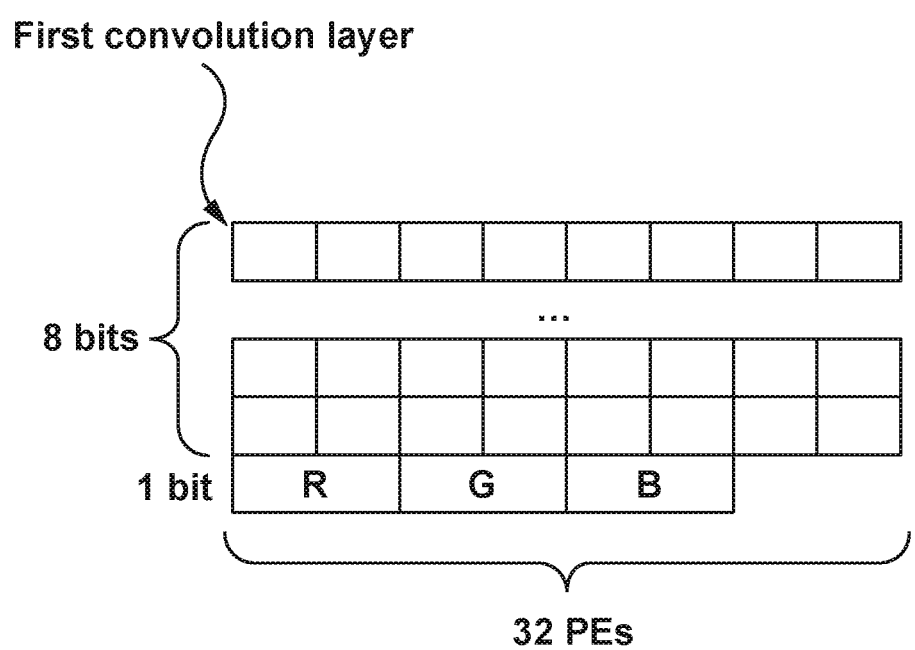
FIG. 17 shows in detail an exemplary layout in memory of color pixel data and data for a convolutional layer of a neural net.

FIG. 17 shows in detail an exemplary layout in memory of color pixel data and data for a convolutional layer of a neural net.

Figure 18:
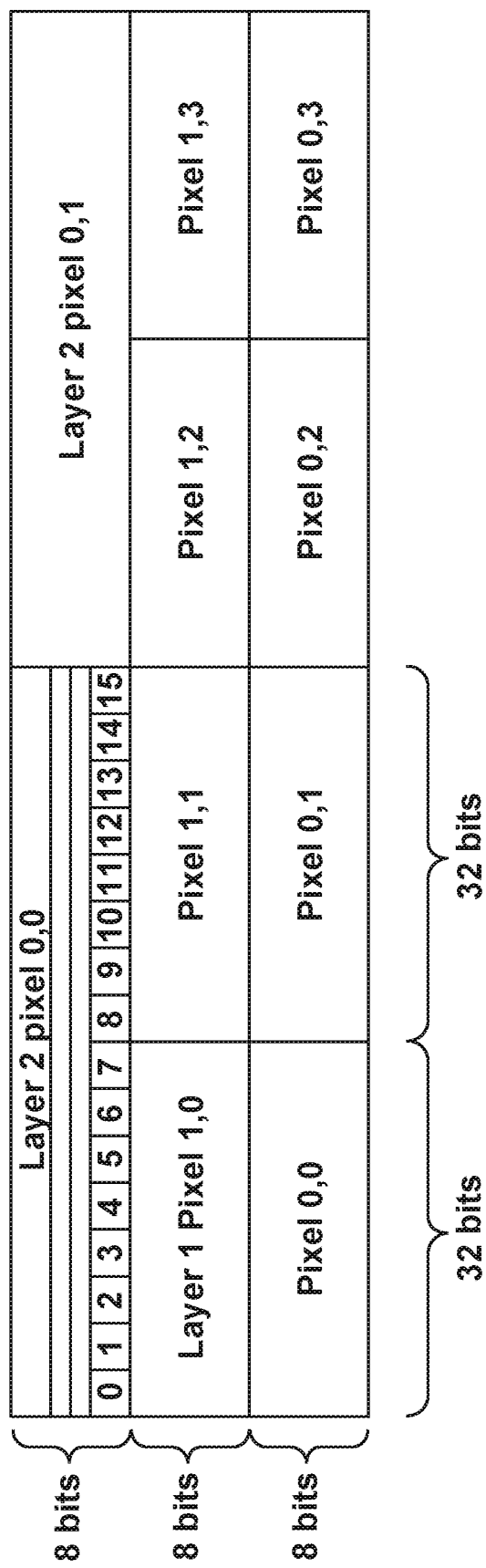
FIG. 18 shows an exemplary layout in memory of data for pooling in a neural net.

FIG. 18 shows an exemplary layout in memory of data for pooling in a neural net.

Image data is indicated by tuples representing pixel coordinates. An example image size is 256 by 256 pixels.

The present invention provides enhancements for control, communications and processing in C*RAM, particularly adapted to the very large arrays of data and multiple arithmetic types and vector sizes characteristic of neural net computations. Several configurations of processing elements, row-direction communication structures, column-direction communication structures, SIMD controllers and methods of coordinating SIMD controllers are discussed.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A device comprising:
   memory;
   a plurality of processing elements for performing parallel operations using the memory;
   a plurality of controllers for controlling the plurality of processing elements wherein one or more of the plurality of controllers are configured to control a plurality of segment switches;
   a column bus operable to unidirectionally or bidirectionally communicate information among any of the plurality of processing elements, wherein the column bus is segmented and wherein the plurality of controllers are interconnected by the column bus and are configured to share information via the column bus; and
   a row bus segmented by the plurality of segment switches, the row bus operable to unidirectionally or bidirectionally communicate information among any of the plurality of controllers and the plurality of processing elements, wherein the row bus is segmented to provide pipelined flow of information among segments of the row bus.

2. The device of claim 1, wherein a direction of the row bus is set by the plurality of controllers.

3. The device of claim 1, wherein a direction of the row bus is set by a state of one or more of the plurality of processing elements.

4. The device of claim 1, wherein the row bus is configured to provide opcodes.

5. The device of claim 1, wherein at least one of the processing elements comprises a multiplexer configured to put information onto the row bus.

6. The device of claim 5, wherein the multiplexer is further configured to take information from the row bus.

7. The device of claim 1, wherein the row bus is wire-ANDed.

8. The device of claim 1, wherein the row bus is segmented by latching.

9. The device of claim 1, wherein one or more of the plurality of processing elements is configured to control the plurality of segment switches.

10. The device of claim 1, further comprising a plurality of row buses, each row bus of the plurality of row buses operable to unidirectionally or bidirectionally communicate information among any of the plurality of controllers and the plurality of processing elements, wherein at least two of the plurality of row buses are segmented to a different degree.

11. A device comprising:
   a plurality of banks, each bank including memory and a plurality of processing elements for performing parallel operations using the memory;
   a plurality of controllers for controlling the plurality of processing elements wherein the plurality of controllers are configured to control a plurality of segment switches;
   a column bus operable to unidirectionally or bidirectionally communicate information among any of the plurality of processing elements, wherein the column bus is segmented by the plurality of segment switches and wherein the plurality of controllers are interconnected by the column bus and are configured to share information via the column bus; and
   a row bus operable to unidirectionally or bidirectionally communicate information among any of the plurality of controllers and the plurality of processing elements, wherein the row bus is segmented.

12. The device of claim 11, wherein the column bus is operable to unidirectionally or bidirectionally communicate information among any of the plurality of controllers and the plurality of processing elements.

13. The device of claim 11, wherein a direction of column bus is set by the plurality of controllers.

14. The device of claim 11, wherein a direction of the column bus is set by a state of one or more of the plurality of processing elements.

15. The device of claim 11, wherein the column bus is configured to provide opcodes.

16. The device of claim 11, wherein at least one of the processing elements comprises a multiplexer configured to put information onto the column bus.

17. The device of claim 16, wherein the multiplexer is further configured to take information from the column bus.

18. The device of claim 11, wherein the column bus is wire-ANDed.

19. The device of claim 11, wherein the column bus is segmented by latching.

20. The device of claim 11, wherein one or more of the plurality of processing elements is configured to control the plurality of segment switches.

21. The device of claim 11, further comprising a plurality of column buses, each column bus of the plurality of column buses operable to unidirectionally or bidirectionally communicate information among any of the plurality of controllers and the plurality of processing elements, wherein at least two of the column buses are segmented to a different degree.

22. The device of claim 11, wherein the plurality of controllers have nearest-neighbor interconnections configured to enable synchronization.

23. The device of claim 11, wherein the plurality of controllers are interconnected by the column bus are configured to share decoded instructions via the column bus.

24. The device of claim 11, wherein the row bus is segmented by latching.

25. The device of claim 11, wherein the row bus is segmented by the plurality of segment switches.

26. A device comprising:
   memory;
   a plurality of processing elements for performing parallel operations using the memory, wherein one or more of the plurality of processing elements is configured to control a plurality of segment switches;
   a plurality of controllers for controlling the plurality of processing elements;
   a column bus operable to unidirectionally or bidirectionally communicate information among any of the plurality of processing elements, wherein the column bus is segmented and wherein the plurality of controllers are interconnected by the column bus and are configured to share information via the column bus; and
   a row bus segmented by the plurality of segment switches, the row bus operable to unidirectionally or bidirectionally communicate information among any of the plurality of controllers and the plurality of processing elements, wherein the row bus is segmented to provide pipelined flow of information among segments of the row bus.

27. A device comprising:
   memory;
   a plurality of processing elements for performing parallel operations using the memory;
   a plurality of controllers for controlling the plurality of processing elements;

a column bus operable to unidirectionally or bidirectionally communicate information among any of the plurality of processing elements, wherein the column bus is segmented and wherein the plurality of controllers are interconnected by the column bus and are configured to share information via the column bus; and a plurality of row buses, each row bus operable to unidirectionally or bidirectionally communicate information among any of the plurality of controllers and the plurality of processing elements, wherein at least two row buses of the plurality of row buses are segmented to provide pipelined flow of information among segments of the plurality of row buses, and wherein the at least two row buses of the plurality of row buses are segmented to a different degree.

28. A device comprising:

a plurality of banks, each bank including memory and a plurality of processing elements for performing parallel operations using the memory;

a plurality of controllers for controlling the plurality of processing elements;

a plurality of column buses, each column bus of the plurality of column buses operable to unidirectionally or bidirectionally communicate information among any of the plurality of controllers and the plurality of processing elements, wherein the plurality of controllers are interconnected by the plurality of column buses and are configured to share information via the plurality of column buses, wherein the plurality of column buses are segmented and at least two column buses of the plurality of column buses are segmented to a different degree; and a row bus operable to unidirectionally or bidirectionally communicate information among any of the plurality of controllers and the plurality of processing elements, wherein the row bus is segmented.

* * * * *